(12) United States Patent
Talluri et al.

(10) Patent No.: US 7,581,051 B2
(45) Date of Patent: Aug. 25, 2009

(54) METHOD FOR DELIVERING INTERRUPTS TO USER MODE DRIVERS

(75) Inventors: Madhusudhan Talluri, Bellevue, WA (US); Frederick J. Smith, IV, Redmond, WA (US); Jeff L. Havens, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/129,802

(22) Filed: May 16, 2005

(65) Prior Publication Data

US 2006/0259675 A1    Nov. 16, 2006

(51) Int. Cl.
 *G06F 13/24*    (2006.01)
(52) U.S. Cl. .................................................. 710/260
(58) Field of Classification Search .......... 710/260–269
 See application file for complete search history.

(56) References Cited

U.S. PATENT DOCUMENTS

| | | | | |
|---|---|---|---|---|
| 5,297,282 A | * | 3/1994 | Meilak et al. ............... | 713/323 |
| 5,438,677 A | * | 8/1995 | Adams et al. ............... | 710/263 |
| 5,566,346 A | * | 10/1996 | Andert et al. ............... | 710/8 |
| 6,212,574 B1 | * | 4/2001 | O'Rourke et al. ........... | 719/321 |
| 6,412,035 B1 | * | 6/2002 | Webber ...................... | 710/261 |
| 6,732,138 B1 | * | 5/2004 | Browning et al. ........... | 718/102 |
| 6,785,894 B1 | * | 8/2004 | Ruberg ....................... | 719/321 |
| 7,149,832 B2 | * | 12/2006 | Wieland et al. ............. | 710/269 |
| 2002/0078121 A1 | | 6/2002 | Ballantyne | |
| 2002/0152344 A1 | * | 10/2002 | Holm et al. ................. | 710/260 |
| 2004/0003137 A1 | | 1/2004 | Callender et al. | |
| 2004/0210908 A1 | * | 10/2004 | Warwick et al. ............ | 719/310 |
| 2004/0216145 A1 | * | 10/2004 | Wong et al. ................. | 719/321 |

\* cited by examiner

*Primary Examiner*—Glenn A Auve
*Assistant Examiner*—Nimesh G Patel
(74) *Attorney, Agent, or Firm*—Woodcock Washburn LLP

(57) ABSTRACT

Systems and methods for providing a framework within which device drivers may run at a user-mode level. A platform (e.g., APIC) or bus (PCI bus) generic feature is used to take the CPU out of interrupt mode without having to wait for a user-level driver to clear the device interrupt. This allows writing the complete device driver in user space. The device driver still get notifications on interrupts but not at interrupt priority. The same scheme can be extended to shared interrupts, where multiple devices share a single interrupt line.

17 Claims, 4 Drawing Sheets

METHOD FOR DELIVERING INTERRUPTS TO USER MODE DRIVERS

FIELD OF THE INVENTION

This invention relates in general to the field of computer hardware device drivers. More particularly, this invention relates to a system and method of providing and handling interrupts in user mode rather than kernel mode.

BACKGROUND OF THE INVENTION

Drivers in the MICROSOFT WINDOWS operating system and other operating system can run in either user mode or kernel mode. User-mode drivers run in the nonprivileged processor mode in which other application code, including protected subsystem code, executes. User-mode drivers cannot gain access to system data except by calling an API which, in turn, calls system services. Kernel-mode drivers run as part of the operating system's executive, the underlying operating system component that supports one or more protected subsystems.

User-mode and kernel-mode drivers have different structures, different entry points, and different system interfaces. Whether a device requires a user-mode or kernel-mode driver depends on the type of device and the support already provided for it in the operating system. Most device drivers run in kernel mode. Kernel-mode drivers can perform certain protected operations and can access system structures that user-mode drivers cannot access.

When a hardware device interrupts the CPU, it puts the CPU in an elevated interrupt priority where all other processing, except higher priority interrupts, is stopped until some device specific code executes to turn off the interrupt at the device. In kernel-mode, the interrupt is masked such that the CPU is not continually interrupted. However, this is not the case in user-mode. When an interrupt reaches the CPU, an exception is invoked and the CPU's exception handling code will run. In the case of an external interrupt, the CPU will start by clearing its interrupt enable flag, meaning it will ignore interrupts until the flag is cleared. This occurs whether user mode or kernel mode code is executing at the time. With kernel mode drivers, however, the interrupt can be handled immediately. However, with a user mode interrupt handler, the processor must return to user mode first, and then service the interrupt. To do this, the interrupts need to be masked at a level below the CPU level, i.e, at the APIC, bus, or device level, to allow the user mode interrupt service routine (ISR) to execute. Thus, device drivers conventionally run in kernel-mode because of the complexity associated with servicing a user-mode device driver.

Accordingly, there is a need for an operating system mechanism to deliver interrupts in user-mode such that additional classes of devices may use user-mode drivers. The present invention provides such a solution.

SUMMARY OF THE INVENTION

The present invention is directed to systems and methods for allowing device drivers to run at a user-mode level. A platform (e.g., APIC) or bus (PCI bus) generic feature is used to block interrupts from reaching the CPU without having to wait for a user-level driver to clear the device interrupt. This allows writing the complete device driver in user space. The device driver still receives notifications on interrupts but not at interrupt priority. The same scheme can be extended to shared interrupts, where multiple devices share a single interrupt line.

According to a feature of the invention, a kernel service is provide that acts as a generic interrupt functionality. An I/O Manager performs resource allocation/bootstrap/orchestration of the components. An IPC mechanism allows the components to communicate with each other. The interrupt service provides a factory interface to the I/O manager to allocate an interrupt object to be passed to drivers. The interrupt service exposes a second interface which user-mode drivers may call when they are ready to receive an interrupt. Returning from this call implies that a hardware interrupt had occurred and that the driver should communicate/manipulate the device.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
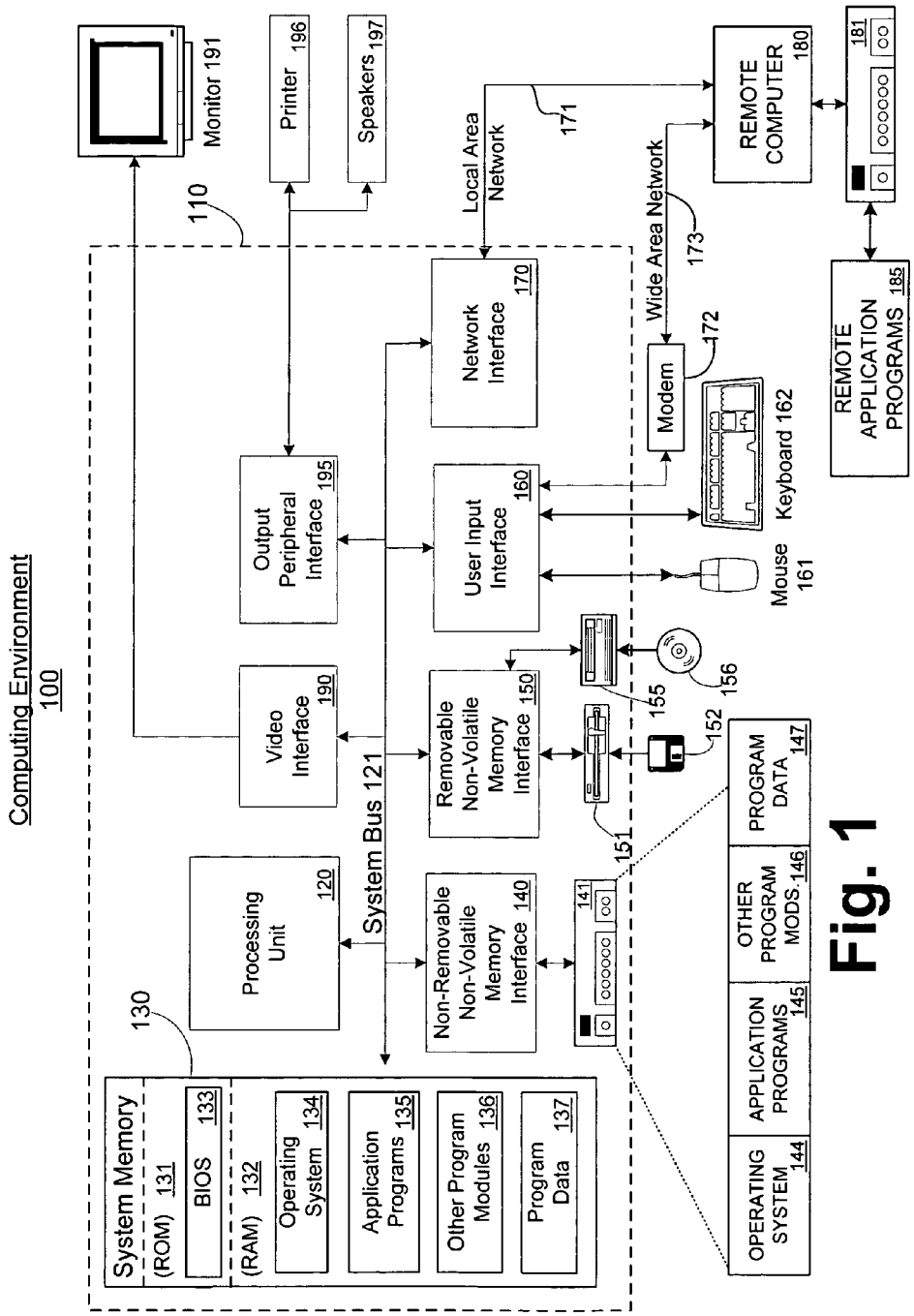
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments

The present invention implements systems and methods using a platform (e.g., APIC) or bus (PCI bus) generic feature to bring the CPU 120 out of interrupt mode without having to wait for a user-mode driver to clear a device interrupt. This advantageously allows a complete device driver to be written in user-mode. The user-mode device driver receives notifications about interrupts, but not at high interrupt priority. As will be described below, the present invention may be extended to shared interrupts, where multiple devices share a single interrupt line.

Figure 2:
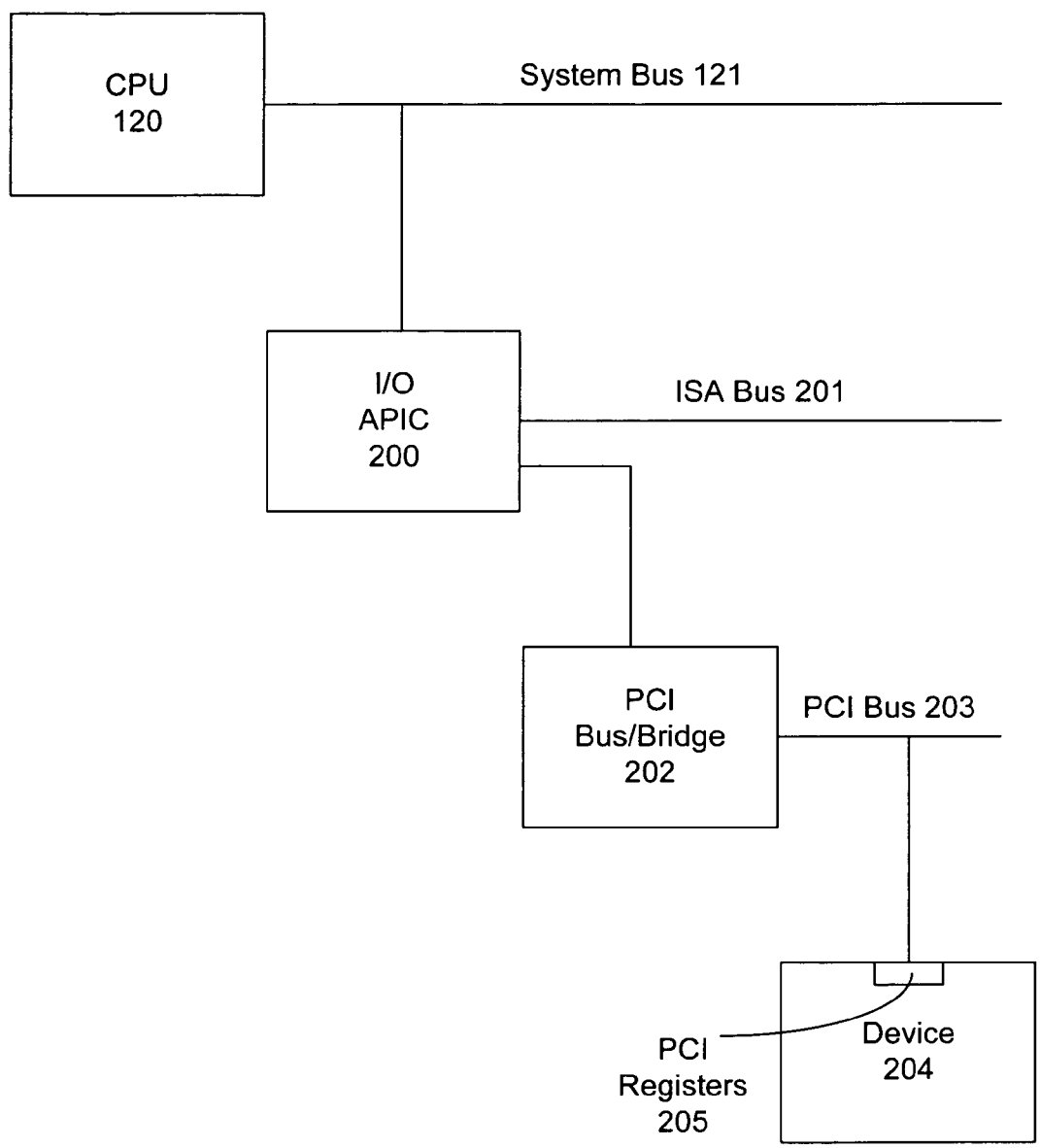
FIG. 2 is shown a typical architecture within a computing device, such as that of FIG. 1.

Referring now to FIG. 2, there is shown a typical architecture within a computing device. One or more CPUs 120 is connected to an I/O APIC 200 (i.e., an I/O controller) and a PCI Bus/Bridge 202. In the INTEL architecture, there may be as many as eight I/O APICs on a system. They collect interrupt signals from I/O devices and send messages to the local APICs when those devices need to interrupt. Each I/O APIC has an arbitrary number of interrupt inputs (or IRQs).

Various system buses 121 are provided, such as an ISA Bus 210, PCI Bus 203, to which devices 204 are connected. Devices 204 that are connected to the PCI bus 203 include PCI registers 205, as known by those of ordinary skill in the art. An interrupt generated by the device 204 is routed to the interrupt controller 200 and eventually to the CPU 120. There is a path from the CPU to the device 204 so a driver executing on the CPU 120 can access/manipulate the hardware device 204.

Figure 3:
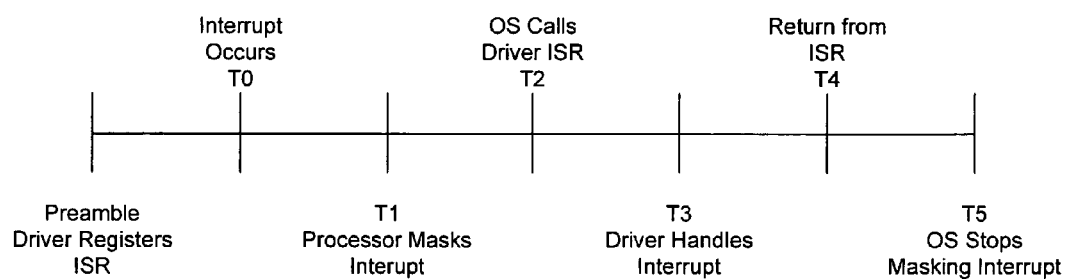
FIG. 3 illustrates a timeline for a conventional method of handling interrupts, where the device driver resides in kernel-mode.

Referring to FIG. 3, there is illustrated a timeline for a conventional method of handling interrupts, where the device drivers reside in kernel-mode. Initially, a device driver registers its interrupt service routine (ISR) at a preamble stage. When an interrupt occurs at T0, it is masked by the CPU at T1 so that the processor is not continuously interrupted. At T2, the operating system calls the driver ISR and the driver handles the interrupt at T3 to clear the interrupt. At T4, control returns from the ISR and at T5, the operating system stops masking the interrupt so a next interrupt can be handled, if necessary.

A problem with the conventional processing of FIG. 3 is that masking of interrupts occurs at the CPU level. It is preferable to mask interrupts at the CPU level for the shortest possible time to allow another higher priority interrupt can come in, essentially interrupting the lower priority interrupt handler. The present invention allows one or more device drivers may be run as user-mode programs/processes. A kernel service is provided that acts as a generic interrupt functionality. Interrupts are masked at a lower level (i.e., below CPU level, as described below) until the code in the user-mode driver wakes up and handles the interrupt. In accordance with the present invention, kernel mode interrupts may be masked at the APIC level before invoking the kernel mode ISR.

The interrupt service of the present invention exposes an interface (e.g., "wait_for_interrupt") which is called by the user-mode drivers when they are ready to receive an interrupt.

The interrupt service provides an interface to an I/O manager to allocate an interrupt object to be passed to drivers. When starting a device driver, the I/O manager uses the interface to create an interrupt object and passes it to the device driver giving it access to a specific interrupt line. The driver calls wait_for_interrupt when it is ready to receive an interrupt and/or expects one. Returning from this call implies that a hardware interrupt had occurred and that the driver should communicate/manipulate the device.

Before calling wait_for_interrupt to wait for the next interrupt, the driver preferably completes whatever activity it is performing for the device and clear the cause of the device interrupt. The next device interrupt will cause this wait_for_interrupt to return. A dedicated thread (preferably not the main thread) is used for this waiting process and elevated priority may be applied to it. The interrupt service masks interrupts from reaching the CPU in a device-independent way for user-mode drivers. For example, the particular interrupt line can be masked in a typical APIC. Certain buses such as PCI 2.3 have a toggle in the config space which can be disabled/enabled in a bus-specific way.

Figure 4:
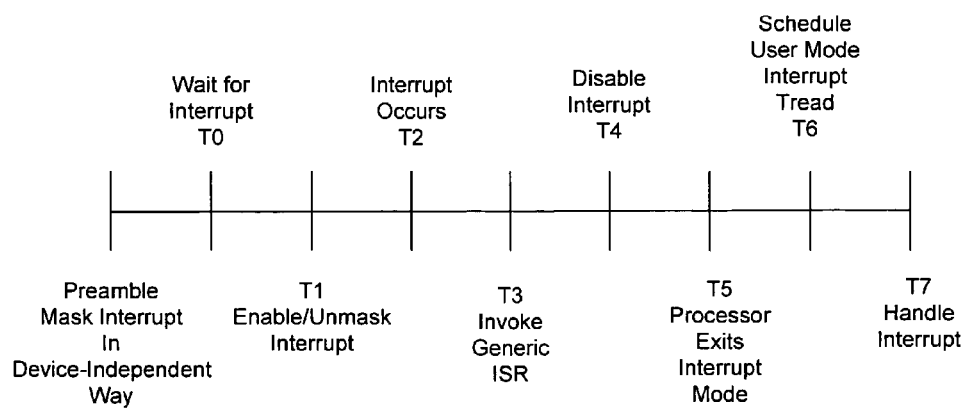
FIGS. 4-5, illustrate timelines for handling interrupts in accordance with the present invention.

In accordance with the present invention, interrupt masking in a device-independent manor is a mechanism for disabling interrupts on the device (or masking them) without programming the device in a device-specific way. The user mode ISR is the code for the interrupt service routine that is located in, and run in, the context of a user mode thread, as described below. FIG. 4 illustrates a timeline for a non-shared user mode interrupt mechanism. This mechanism works for devices that are not sharing an interrupt line, devices using message signaled interrupts, or for devices sharing an interrupt line (with user or kernel drivers) but on a bus that supports a device independent mechanism for masking device interrupts.

Referring not to FIG. 4, the interrupt service starts out by disabling or masking all the interrupts in a device-independent way at a preamble stage. When a driver calls wait_for_interrupt at T0 to park a thread in the service, that particular interrupt is enabled/unmasked at T1. When a device associated with the driver causes an interrupt or one was pending when interrupts were enabled at T1, an event occurs and the CPU is interrupted at T2. The event may be auto-reset to be cleared.

A generic kernel mode interrupt handler registered for the interrupt is called at T3, which disables/re-masks the interrupt line at T4. This is done at a lower level than the CPU (e.g., at the I/O APIC 200, PCI Bus/Bridge 202, the operating system, etc.). In other words, the device interrupt is preferably disabled as close to the device 204 as possible at T4. The processor then exits interrupt mode at T5 and the user mode interrupt thread is scheduled at T6 to call the driver waiting for that interrupt. The driver processes the interrupt at T7 and returns. The interrupt line is enabled again to for the next interrupt.

A problem with sharing interrupts for user level ISRs is a latency issue. In general, it is desirable to keep interrupts masked for the shortest amount of time possible. In the case of a user mode ISR, the interrupt is masked until the ISR runs. This may take a significant amount of time. A device sharing the same interrupt line would have its interrupts blocked until interrupts for the line are unmasked again. Therefore, unless all of the drivers with a user mode ISR sharing a given interrupt line are waiting for an interrupt, the line is masked.

Figure 5:
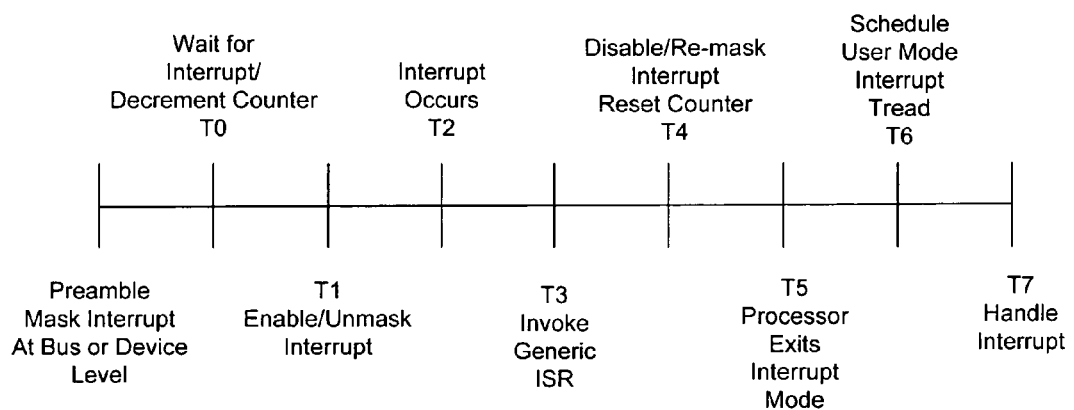

Referring now to FIG. 5, there is an exemplary time line for a shared user mode interrupt mechanism on a bus that does not support device per device interrupt masking. Initially, the interrupt for each of the devices sharing the interrupt is masked at the bus or device level. Here again, it is preferable to mask the interrupt at the lowest level possible, however, sometimes it is more convenient to mask at one level or another. In this case the present invention can mask at the device level or at the bus level. Masking at a bus level is a PCI 2.3 feature where an interrupt disable bit that allows a device interrupt to be masked. This is a bus feature, with device level granularity. Masking at the device level is a device specific mechanism for disabling interrupts. This is typically not preferred because it requires device specific code.

Later at T0, the user mode driver(s) for the device(s) waits for an interrupt by calling the WaitForInterrupt method on its interrupt object. There is a counter (initially set to the number of drivers sharing the interrupt) which is decremented each time a driver invokes the WaitForInterrupt method, the thread subsequently blocks on the event object for the given interrupt line. When the counter mentioned above goes to zero, meaning all of the user mode device drivers sharing the given interrupt line are waiting for interrupts, the WaitForInterrupt method will unmask interrupts for the device being controlled (T1).

At a time after the device interrupts were unmasked, an interrupt can occur (T2). When an interrupt occurs, the generic kernel mode interrupt service routine (ISR) registered for the interrupt will be invoked (T3). The system handles this interrupt substantially the same way kernel mode interrupts are handled in conventional system. The ISR will first re-mask the device interrupt (T4), and then signal the event which the user mode ISR is blocked on. The per-interrupt line counter is then reset to the number of drivers sharing the interrupt line. The processor then exits interrupt mode (T5). The user mode thread(s) will now all wake up (T6). Each thread tests whether the hardware it is controlling generated the interrupt, and if so, service the interrupt (T7). When completed, the WaitForInterrupt is called again.

In accordance with the present invention, sharing interrupts between user mode and kernel mode components is similar to sharing them with only user mode components. The difference is in how the generic kernel ISR works. In this scenario, the generic kernel mode ISR is invoked after the ISRs for the kernel mode drivers sharing the interrupt line. This way if the device generating the interrupt is a kernel mode device, it can be serviced quickly in the kernel and will not wake up the user mode ISRs. With the exception of increasing latency, because the interrupt line is masked more often, kernel drivers are not be affected by this scheme. In addition, the kernel mode drivers are not included in the count of how many drivers are sharing the interrupt line.

In accordance with the above, the present invention is able to handle interrupts in an operating system generic manner without the need for a specific driver for each device as any device interrupt can be disabled without knowledge of the device. This is because generally, the operating system has knowledge of the I/O APIC 200 and can disable interrupts at least at that level. As noted above, it is preferable to handle interrupts as close to the device as possible.

The present invention also provides for a driver that fails to register with the operating system. If an interrupt is generated by a device whose device driver failed to register, or is unknown, the interrupt is turned off at the device level and the device is disabled to prevent any further interrupts. Alternatively, under a common control scheme, when other registered drivers report that the interrupt is "not theirs," the interrupt is disabled to effectively turn off the device.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A device-independent computer-implemented method of handling interrupts, comprising:
   registering a device driver with an operating system, wherein the device driver runs in user mode;
   providing a device-independent interrupt service as a kernel service, said device-independent interrupt service exposing an interface that is called by said driver to enable an interrupt;
   masking the interrupt in a device-independent way at a processor;
   receiving via the interface a call from the device driver, the call causing an interrupt line to be parked with the device-independent interrupt service;
   unmasking the interrupt;
   receiving the interrupt;
   invoking a generic kernel mode interrupt service routine upon receipt of said interrupt and subsequent to invoking interrupt service routines for kernel mode drivers sharing the interrupt line;
   running the generic kernel mode interrupt service routine, said generic kernel mode interrupt service routine remasking the interrupt at a level lower than said processor, and scheduling at user mode to call said device driver to handle the interrupt;
   handling said interrupt by said device driver; and
   enabling the interrupt line to receive another interrupt.

2. The computer-implemented method of claim 1, said disabling said interrupt occurring at one of an APIC or a bus controller.

3. The computer-implemented method of claim 1, further comprising:
   providing a scheduling mechanism for sharing said interrupt;
   calling all drivers sharing said interrupt; and
   maintaining said disabling of said interrupt until all drivers return from said handling said interrupt.

4. The computer-implemented method of claim 3, further comprising setting a counter to a number of drivers sharing said interrupt.

5. The computer-implemented method of claim 4, further comprising decrementing said counter to zero before enabling said interrupt.

6. The computer-implemented method of claim 3, wherein a second driver is provided at a kernel-mode level, and said method is performed for both user- mode and kernel-mode drivers.

7. The computer-implemented method of claim 1, wherein said kernel service is a generic service independent of a device handled by said driver, and wherein said driver is a user-mode driver.

8. A computer-implemented method for handling user-mode device drivers, comprising:
registering said user-mode device drivers with an operating system; and
providing a device-independent interrupt service as a kernel service, said device-independent interrupt service exposing an interface that is called by said user-mode device drivers to enable an interrupt;
masking said interrupt at a processor before running said device-independent interrupt service;
receiving via the interface a call from one of the user-mode device drivers, the call causing an interrupt line to be parked with the device-independent interrupt service;
unmasking the interrupt;
receiving the interrupt;
invoking a generic kernel mode interrupt service routine upon receipt of said interrupt and subsequent to invoking interrupt service routines for kernel mode drivers sharing the interrupt line;
running the generic kernel mode interrupt service routine;
disabling said interrupt at a lower level than said processor to prevent said interrupt from reaching said processor;
scheduling at user mode to call said one of the user-mode device drivers to handle the interrupt;
handling said interrupt by said one of the user-mode device drivers; and
enabling the interrupt line to receive another interrupt.

9. The computer-implemented method of claim 8, wherein said disabling said interrupt occurs at one of an APIC or a bus controller.

10. The computer-implemented method of claim 8, further comprising:
providing a scheduling mechanism for shared interrupts;
calling all user-mode device drivers associated with said shared interrupts; and
maintaining said disabling of said interrupt until all user-mode device drivers return from handling said interrupt.

11. The computer-implemented method of claim 10, further comprising:
executing said scheduling mechanism for unregistered or unknown devices; and
disabling said unregistered or unknown device.

12. The computer-implemented method of claim 8, wherein a second driver is provided at a kernel-mode level kernel-mode level, and said method is performed for both said user-mode device drivers and kernel-mode device drivers.

13. A computer readable storage medium having stored thereon instructions for handling user-mode device drivers, said instructions being executed to perform a method comprising:
registering the user-mode device drivers with an operating system;
providing an interrupt service as a kernel service, said interrupt service exposing an interface that is called by the user-mode device drivers to enable an interrupt; and
allocating an interrupt object to one of the user-mode device drivers and passing the interrupt object to the one of the user-mode device drivers, the interrupt object providing access to an interrupt line;
masking said interrupt at a processor;
receiving via the interface a call from the one of the user-mode device drivers, the call causing an interrupt line to be parked with the interrupt service;
unmasking the interrupt;
receiving the interrupt;
invoking a generic kernel mode interrupt service routine upon receipt of said interrupt and subsequent to invoking interrupt service routines for kernel mode drivers sharing the interrupt line;
running the generic kernel mode interrupt service routine;
disabling said interrupt at a lower level than said processor to prevent said interrupt from reaching said processor;
scheduling at user mode to call the one of the user-mode device drivers to handle the interrupt;
handling said interrupt by the one of the user-mode device drivers; and
enabling the interrupt line to receive another interrupt.

14. The computer readable storage medium of claim 13, said disabling said interrupt occurring at one of an APIC or a bus controller.

15. The computer readable storage medium of claim 13, further comprising instructions for:
providing a scheduling mechanism for shared interrupts;
calling all user-mode device drivers associated with said shared interrupts; and
maintaining said disabling of said interrupt until all user-mode device drivers return from handling said interrupt.

16. The computer readable storage medium of claim 15, further comprising instructions for:
executing said scheduling mechanism for unregistered or unknown devices; and
disabling said unregistered or unknown device.

17. The computer storage readable medium of claim 15, wherein a second driver is provided at kernel-mode level, and said instructions for are performed for both said user-mode device for both said user-mode device drivers and kernel-mode device drivers.

* * * * *